(12) United States Patent
Tsui

(10) Patent No.: US 8,416,203 B2  
(45) Date of Patent: Apr. 9, 2013

(54) METHOD AND APPARATUS FOR PREVENTING ON-SCREEN KEYS FROM BEING ACCIDENTALLY TOUCHED AND RECORDING MEDIUM USING THE SAME

(75) Inventor: Yuan-Mao Tsui, Taoyuan County (TW)

(73) Assignee: HTC Corporation, Taoyuan County (TW)

( * ) Notice: Subject to any disclaimer, the term of this patent is extended or adjusted under 35 U.S.C. 154(b) by 1022 days.

(21) Appl. No.: 12/427,767

(22) Filed: Apr. 22, 2009

(65) Prior Publication Data

US 2010/0207894 A1 Aug. 19, 2010

(30) Foreign Application Priority Data

Feb. 13, 2009 (TW) ................ 98104655 A (51) Int. Cl.  
*G06F 3/041* (2006.01)

(52) U.S. Cl.  
USPC ........................ 345/173; 178/18.01

(58) Field of Classification Search ........... 345/169, 345/173; 178/18.01; 455/556.2, 566  
See application file for complete search history.

(56) References Cited

U.S. PATENT DOCUMENTS

| 7,899,499 | B2 * | 3/2011 | Kang et al. .................. 455/566 |
| 8,164,573 | B2 * | 4/2012 | DaCosta et al. ............. 345/173 |
| 2005/0079896 | A1 | 4/2005 | Kokko et al. | |
| 2006/0187211 | A1 | 8/2006 | Uusitalo et al. | |
| 2007/0257895 | A1 | 11/2007 | Tolaio | |
| 2008/0207254 | A1 | 8/2008 | Pierce et al. | |
| 2008/0309589 | A1 | 12/2008 | Morales | |

FOREIGN PATENT DOCUMENTS

| CN | 101021762 A | 8/2007 |
| EP | 1076442 | 2/2001 |
| JP | 2000349886 | 12/2000 |
| JP | 2004159028 | 6/2004 |
| JP | 2005130278 | 5/2005 |
| TW | 200828097 | 7/2008 |
| WO | 2006094308 | 9/2006 |

OTHER PUBLICATIONS

"Search Report of Europe Counterpart Application", issued on Oct. 7, 2011, p. 1-p. 5.  
"T-Mobile. G1 User Guide", Internet Citation, Sep. 12, 2008, p. 143pp. xp007917079, Retrieved from the internet: URL: http://issuu.com/dhpss/docs/tm30234 [retrieved on Feb. 9, 2011], p. 82-p. 83.  
"First Office Action of China Counterpart Application", issued on Feb. 29, 2012, p. 1-p. 5.  
"Office Action of Taiwan counterpart application" issued on Jun. 21, 2012, p. 1-p. 3.

* cited by examiner

*Primary Examiner* — Abbas Abdulselam  
(74) *Attorney, Agent, or Firm* — Jianq Chyun IP Office (57) ABSTRACT

A method and an apparatus for preventing on-screen keys from being accidentally touched and a recording medium using the same are provided. In the present method, when a mobile device enters a communication mode, a user interface of the communication mode, which comprises at least one on-screen key, is displayed on a touch screen of the mobile device. Meanwhile, a protective mask is displayed on the touch screen to cover the on-screen key, and a function corresponding to the on-screen key covered by the protective mask is disabled. Accordingly, users can avoid accidentally touching the on-screen keys to make the mobile device perform false actions when speaking on the phone.

23 Claims, 6 Drawing Sheets

METHOD AND APPARATUS FOR PREVENTING ON-SCREEN KEYS FROM BEING ACCIDENTALLY TOUCHED AND RECORDING MEDIUM USING THE SAME

CROSS-REFERENCE TO RELATED APPLICATION

This application claims the priority benefit of Taiwan application serial No. 98104655, filed on Feb. 13, 2009. The entirety of the above-mentioned patent application is hereby incorporated by reference herein and made a part of this specification.

BACKGROUND OF THE APPLICATION

1. Field of the Application

The present application relates to a method and an apparatus of a user interface. More particularly, the present application relates to a method and an apparatus for preventing on-screen keys from being accidentally touched.

2. Description of Related Art

To keep up with the bustling pace of modern human life, various portable and space-saving electronic devices have been put forward one after another. For example, the mobile phone is not only a conventional communication device, but also serves as a mini PC with versatile functions, such as E-mail receiving/sending, network accessing, or real-time communicating. Therefore, such devices have become indispensable tools in a modern life in pursuit of efficiency.

However, to achieve the requirement for lightness, slimness, shortness and smallness, the size of the portable electronic device is limited. If a screen and a keypad are simultaneously disposed in the electronic device, the screen size must be reduced. Therefore, the screen and the keypad are integrated into a touch screen equipped in the portable electronic device to save the space occupied by the traditional keypad.

Operation of a touch screen has the advantages as simple and intuitive compared to a conventional keypad input. However, the touch screen is quite sensitive to an external touch action. If the user carelessly touches the touch screen, the unwanted function corresponding to the on-screen key may be executed. Especially, taking a mobile phone as an example, when the user speaks on the phone, he/she has to take the mobile phone close to his/her ear. Such pose easily leads to a mute key or a call ending key being miss-touched, and the phone call will be interrupted.

SUMMARY OF THE APPLICATION

Accordingly, the present application is directed to a method for preventing on-screen keys from being accidentally touched, by which a protective mask is covered on the on-screen keys during a phone call, so as to prevent the on-screen keys from being accidentally touched.

The present application provides a method for preventing on-screen keys from being accidentally touched, which is adapted to a mobile device having a touch screen, and the method can be described as follows. When the mobile device enters a communication mode, a user interface is first displayed on the touch screen, wherein the user interface comprises at least one on-screen key. Next, a protective mask is displayed on the touch screen to cover the on-screen key, and disable a function corresponding to the on-screen key covered by the protective mask.

The present application provides an apparatus for preventing on-screen keys from being accidentally touched, which comprises a touch screen, a user interface module and a protective mask display module. The touch screen is used for receiving a touch input from a user. The user interface module is used for displaying a user interface on the touch screen, wherein the user interface comprises at least one on-screen key. The protective mask display module is used for displaying a protective mask on the touch screen to cover the on-screen key when the apparatus enters a communication mode, and disabling a function of the on-screen key covered by the protective mask.

The present application provides a recording medium for recording a computer program, wherein the computer program includes a plurality of program codes, which is suitable for being loaded into a portable electronic device to enable the portable electronic device to execute a method for preventing on-screen keys from being accidentally touched. The method comprises following steps. When the mobile device enters a communication mode, a user interface is first displayed on the touch screen, wherein the user interface comprises at least one on-screen key. Next, a protective mask is displayed on the touch screen to cover the on-screen key, and disable a function corresponding to the on-screen key covered by the protective mask.

In order to make the aforementioned and other features and advantages of the present application comprehensible, several embodiments accompanied with figures are described in detail below.

DESCRIPTION OF EMBODIMENTS

When a user speaks on a mobile phone having a touch screen, the user has to take the mobile phone close to his/her ear. Such pose may easily cause an accidental touch on the on-screen keys of the touch screen, such as a mute key and a call ending key. Accordingly, when the user speaks on the phone, a protective mask is displayed on the touch screen to cover the on-screen keys, so as to prevent the on-screen keys from being accidentally touched.

Figure 1:
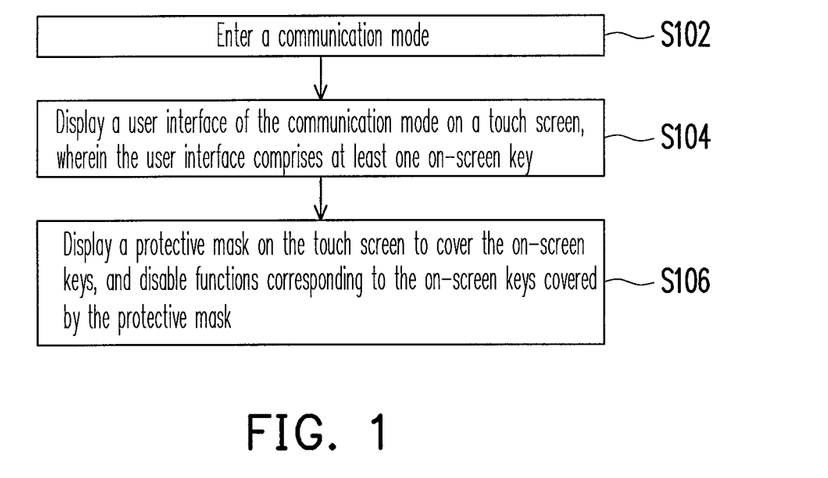
FIG. 1 is a flowchart illustrating a method for preventing on-screen keys from being accidentally touched according to an embodiment of the present application.

FIG. 1 is a flowchart illustrating a method for preventing on-screen keys from being accidentally touched according to an embodiment of the present application. Referring to FIG. 1, the present embodiment is adapted to a mobile device with a touch screen, such as a mobile phone, a smartphone, a PDA phone, or a car PC. The method is described as follows.

First, when the user uses the mobile device to answer a phone call or dial a phone call, the mobile device enters a communication mode (step S102). In detail, when the mobile device receives a phone call and receives a call-answering operation from the user, the mobile device enters the communication mode. The call-answering operation of the user is, for example, to touch a key displayed on the touch screen or to press a hardware key equipped on the mobile device. In addition, when the mobile device receives a dialling operation from the user to dial a phone call or the dialled phone call is answered by a receiver, the mobile device enters the communication mode. The dialling operation of the user is, for example, to touch a key displayed on the touch screen or to press a hardware key equipped on the mobile device.

After the mobile device enters the communication mode, a user interface of the communication mode is displayed on the touch screen of the mobile device (step S104). The user interface can display receiver's information, such as a name, a telephone number, and a photo, and the on-screen keys, such as a call-holding key, a call-adding key, a notebook key, a mute key, a speaker key, a calendar key, a keypad key, and a call ending key.

While displaying the on-screen keys, the mobile device further displays a protective mask on the touch screen to cover the on-screen keys and disables the functions corresponding to the on-screen keys covered by the protective mask (step S106). In other words, when the protective mask covers the on-screen keys, the functions corresponding to the covered on-screen keys are not activated even if the user accidentally touches the on-screen keys. It should be noted that the on-screen keys can be covered by a translucent protective mask, so that the user can still see the on-screen keys covered by the translucent protective mask. However, the protective mask is not limited to be displayed in a translucent way in the present application.

Figure 2:
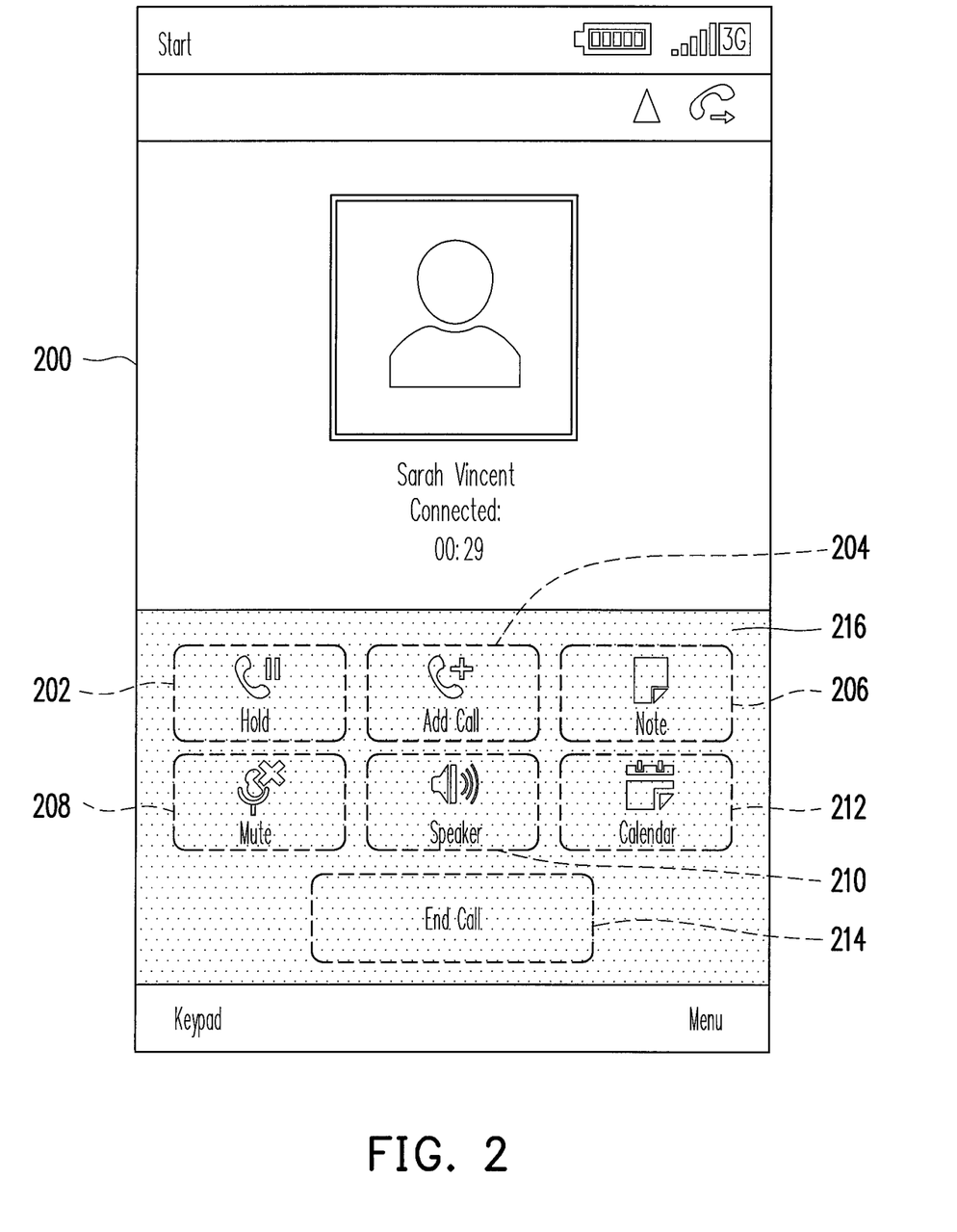
FIG. 2 is a diagram illustrating a user interface with a protective mask for preventing on-screen keys from being accidentally touched according to an embodiment of the present application.

Moreover, by observing the pose of holding the mobile phone when the user speaks on the phone, it is discovered that the user's face is generally only attached to the upper part of the mobile phone, so the on-screen keys of the mobile phone are mostly disposed at the lower part of the touch screen. However, the user may still miss-touch the on-screen keys located at the lower part of the touch screen during the phone call. Therefore, according to the present application, when the user speaks on the phone, a translucent protective mask is displayed at the lower part of the touch screen to cover and disable the on-screen keys, so as to prevent the on-screen keys from being accidentally touched. For example, FIG. 2 is a diagram illustrating a user interface with a protective mask for preventing the on-screen keys from being accidentally touched according to an embodiment of the present application. Referring to FIG. 2, the user interface 200 of the present embodiment is a user interface of the communication mode. The upper part of the user interface displays the receiver's information, including the name (e.g., Sarah Vincent) and the photo, and a talk time with the receiver. The lower part of the user interface displays the on-screen keys, including a call-holding key 202, a call-adding key 204, a notebook key 206, a mute key 208, a speaker key 210, a calendar key 212, and a call ending key 214. Moreover, the mobile device further displays a translucent protective mask 216 in the lower part of the touch screen to cover the above-mentioned on-screen keys. In this situation, even if the user touches any of the on-screen keys covered by the protective mask 216, no function is to be executed. In another embodiment of the present application, the protective mask can cover the whole touch screen.

The present application also provides a method to remove the protective mask. The user can remove the protective mask by, for example, dragging the protective mask or pressing a hardware key equipped on the mobile device so as to operate the on-screen. keys. Another embodiment is provided below for further description.

Figure 3:
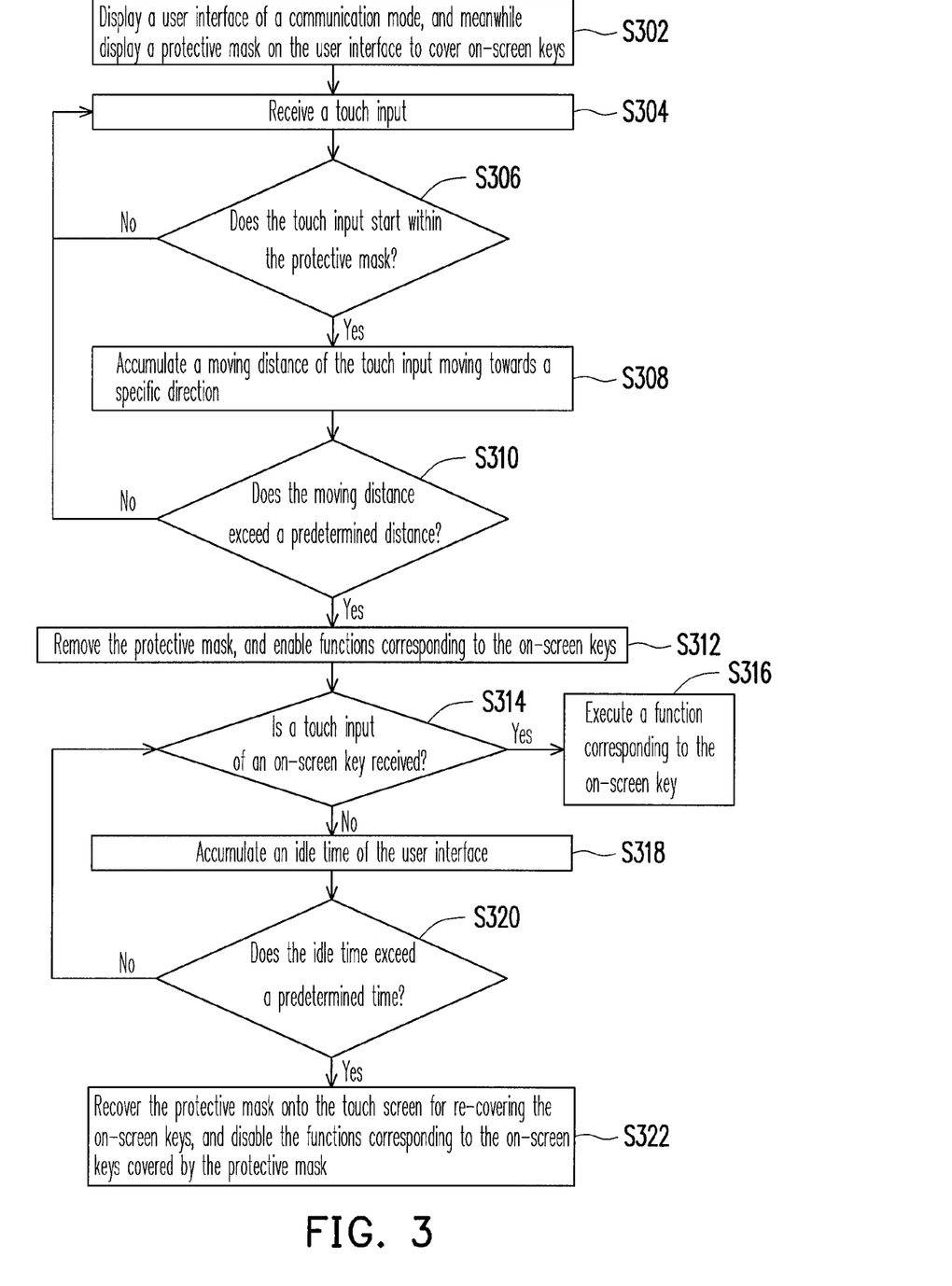
FIG. 3 is a flowchart illustrating a method for recovering functions of on-screen keys according to an embodiment of the present application.

FIG. 3 is a flowchart illustrating a method for recovering the functions of the on-screen keys according to an embodiment of the present application. The method can be described as follows.

Referring to FIG. 3, first, when the mobile device enters the communication mode, the user interface of the communication mode is displayed on the touch screen, and meanwhile the protective mask is displayed on the touch screen to cover the on-screen keys on the user interface (step S302). As described above, the on-screen keys covered by the protective mask are disabled to prevent the user from miss-touching.

Next, the mobile device receives a touch input generated from the user's touching on the touch screen (step S304). The mobile device determines whether a touch input starts within the protective mask (step S306). If the touch input does not start within the protective mask, the mobile device continues receiving the touch input (back to step S304). Otherwise, the mobile device further determines whether the touch input is substantially moved towards a specific direction. The specific direction is, for example, a downward direction, which is not a limitation of the present application.

In an embodiment of the present application, if the touch input starts within the protective mask and the touch input is moved towards the specific direction, the mobile device then accumulates a moving distance towards the specific direction (step S308) and determines whether the moving distance exceeds a predetermined distance (step S310). If the touch input is not moved towards the specific direction, or if the touch input is moved towards the specific direction but the moving distance does not exceed the predetermined distance, the touch input is then ignored and the step S304 is repeated. Conversely, if the touch input is substantially moved towards the specific direction and the moving distance exceeds the predetermined distance, the mobile device removes the protective mask and enables the functions of the on-screen keys originally covered by the protective mask (step S312). The way for the mobile device to remove the protective mask comprises, for example, sliding the protective mask downwards into a lower edge of the touch screen, and this way makes the user feel like pulling down the protective mask to remove it.

Next, the mobile device determines whether a touch input of an on-screen key is received (step S314). If the touch input of the on-screen key is received, the corresponding function of the on-screen key is executed (step S316). For example, if the user touches a volume-adjusting key, the mobile device then displays a volume-adjusting interface for the user to adjust a volume. If the user touches a call ending key, the mobile device then ends the phone call, and stops displaying the protective mask and the user interface.

However, if the touch input of the on-screen key is not received, the mobile device then accumulates an idle time of the user interface (step S318) and determines whether the idle time exceeds a predetermined time (step S320). If the idle time does not exceed the predetermined time, step S314 is then repeated for continually detecting whether a touch input of an on-screen key is received. Conversely, if the idle time exceeds the predetermined time, the mobile phone displays the protective mask onto the touch screen again for re-covering the on-screen keys, and disables the functions of the on-screen keys covered by the protective mask again (step S322). The way for the mobile device to recover the protective mask is, for example, sliding the protective mask upwards from the lower edge of the touch screen to a position where the protective mask can cover all of the on-screen keys.

According to the aforementioned displaying and removing methods, the mobile device can not only prevent the on-screen keys from being accidentally touched by the user during the phone call, but also provides users with a flexibility to operate the on-screen keys. It should be noted that besides covering all of the on-screen keys, according to the present application, some commonly used on-screen keys within the protective mask can be kept uncovered, so that the user can press the uncovered on-screens to execute the corresponding functions during the phone call. Another embodiment is provided below for further description.

Figure 4:
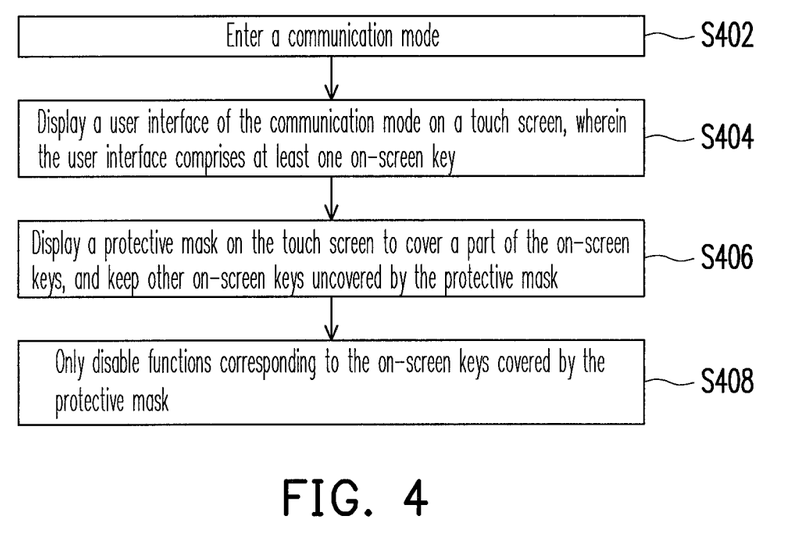
FIG. 4 is a flowchart illustrating a method for preventing on-screen keys from being accidentally touched according to another embodiment of the present application.

FIG. 4 is a flowchart illustrating a method for preventing the on-screen keys from being accidentally touched according to another embodiment of the present application. Referring to FIG. 4, the present embodiment is adapted to a mobile device with a touch screen, and the mobile device can be a mobile phone, a smartphone, a PDA phone or a car PC. The method can be described as follows.

First, when the user uses the mobile device to answer a phone call or dial a phone call, the mobile device enters a communication mode (step S402). Next, the mobile device displays a user interface of the communication mode on the touch screen of the mobile device (step S404), and the user interface comprises the on-screen keys for use on the phone, such as the call-holding key and the call-adding key.

While displaying the on-screen keys, the mobile device further displays a protective mask on the touch screen to cover a part of the on-screen keys, and keeps the other on-screen keys uncovered by the protective mask (S406). Meanwhile, the mobile device only disables the functions corresponding to the on-screen keys covered by the protective mask (step S408). In this situation, when the user touches the on-screen keys, only the functions corresponding to the on-screen keys not covered by the protective mask can be executed. In other words, the on-screen keys not covered by the protective mask are still functional, and the user can still touch the on-screen keys to execute the corresponding functions.

Moreover, by observing a pose of holding the mobile phone when the user speaks on the phone, it is discovered that the user's face is generally only attached to the upper part of the mobile phone. Therefore, in the present embodiment, the on-screen keys not covered by the protective mask are disposed in a specific region located at a one-fourth to one-fifth lower part of the touch screen to avoid the user's miss-touching.

Figure 5:
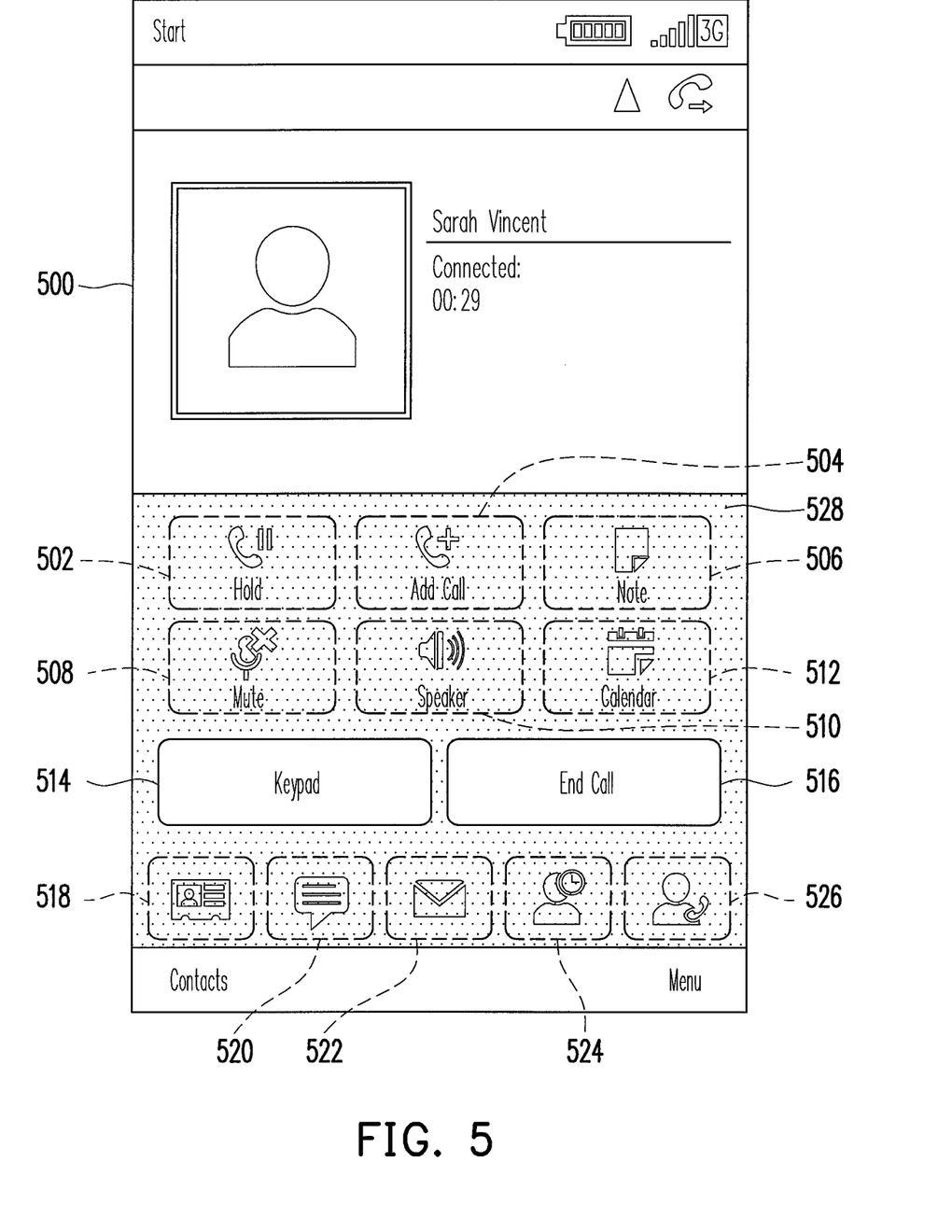
FIG. 5 is a diagram illustrating a user interface with a protective mask for preventing on-screen keys from being accidentally touched according to another embodiment of the present application.

For example, FIG. 5 is a diagram illustrating a user interface with a protective mask for preventing the on-screen keys from being accidentally touched according to another embodiment of the present application. Referring to FIG. 5, the user interface 500 is a user interface of the communication mode. The upper part of the user interface displays the receiver's information, including the name (e.g., Sarah Vincent) and the photo, and a talk time with the receiver. The lower part of the user interface displays the on-screen keys, including a call-holding key 502, a call-adding key 504, a notebook key 506, a mute key 508, a speaker key 510, a calendar key 512, a keypad key 514, a call ending key 516, a basic information key 518, a message key 520, an E-mail key 522, a social information key 524, and a call record key 526. Moreover, the mobile device further displays a translucent protective mask 528 in the lower part of the touch screen to cover the above-mentioned on-screen keys except the keypad key 514 and the call ending key 516. In this situation, if the user touches any of the on-screen keys covered by the protective mask 528, no function is executed. However, the user can still active a screen keypad by touching the keypad key 514, or end a present phone call by touching the call ending key 516.

The present application provides a corresponding apparatus, so that the aforementioned method can be applied to the devices with the touch screen, such as a mobile phone, a smartphone, a PDA phone, and a car PC. The touch screen used for receiving the touch input from the user is, for example, a capacitive or resistive touch screen, or a single-point or multi-point touch screen. Another embodiment is provided below for further description.

Figure 6:
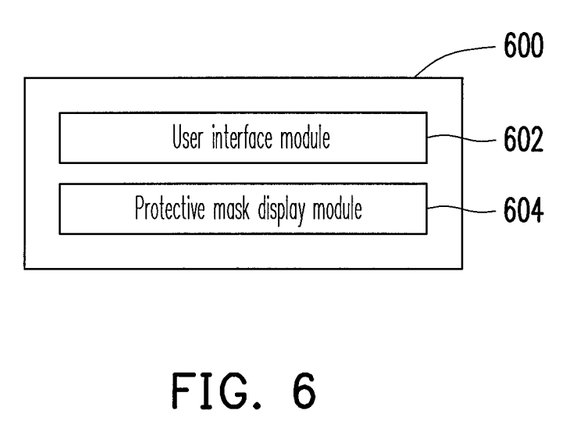
FIG. 6 is a block diagram illustrating an apparatus for preventing on-screen keys from being accidentally touched according to an embodiment of the present application.

FIG. 6 is a block diagram illustrating an apparatus for preventing the on-screen keys from being accidentally touched according to an embodiment of the present application. Referring to FIG. 6, the apparatus 600 includes a user interface module 602 and a protective mask display module 604, and the functions thereof are described as follows.

The user interface module 602 is used for displaying the user interface of the communication mode on the touch screen when the mobile device is in the communication mode. The user interface displays the receiver's information, such as a name, a telephone number, a photo, and the on-screen keys, such as a call-holding key, a call-adding key, a notebook key, a mute key, a speaker key, a calendar key, a keypad key, a call ending key.

The protective mask display module 604 is used for displaying a protective mask on the touch screen to cover the on-screen keys when the mobile device is in the communication mode, and disabling the functions of the on-screen keys covered by the protective mask to prevent the on-screen keys from being accidentally touched by the user during the phone call.

It should be noted that in the communication mode, the protective mask display module 604 determines whether a touch input received by the touch screen is started within a display range of the protective mask. If the protective mask display module 604 determines that the touch input is started within the display range of the protective mask, a moving distance that the touch input moves towards a specific direction is then accumulated. When the moving distance exceeds a predetermined distance, the protective mask display module 604 removes the protective mask and re-enables the functions of the on-screen keys originally covered by the protective mask, so that the user can operate the on-screen keys to execute the corresponding functions.

In addition, after the user operates the on-screen keys, the protective mask can be recovered to avoid miss-touching. Therefore, after the protective mask display module 604 removes the protective mask, if no touch input is detected by the touch screen, the protective mask display module 604 then accumulates an idle time of the user interface. When the idle time exceeds the predetermined time, the protective mask display module 604 displays the protective mask on the touch screen again to cover the on-screen keys to prevent the on-screen keys from being accidentally touched by the user.

Moreover, as described above, the protective mask display module 604 can keep a part of the commonly used on-screen keys not covered by the protective mask. For example, a part of the commonly used on-screen keys is located within the protective mask but not covered by the protective mask, so that the user can touch the uncovered on-screens to execute the corresponding functions during the phone call. The method of keeping a part of the on-screen keys uncovered is described in the aforementioned embodiment, and therefore detailed description thereof is not repeated.

The present application further provides a recording medium for recording a computer program to be loaded into an electronic device for executing the method for preventing on-screen keys from being accidentally touched. The computer program is constituted by a plurality of program code segments (e.g. generating organizational diagram program code segment, endorsing sheet program code segment, configuration program code segment, and deployment program code segment), and after the program code segments are loaded in the mobile device and executed, the steps of the method for preventing on-screen keys from being accidentally touched are completed, and the functions of the apparatus for preventing on-screen keys from being accidentally touched are carried out.

In summary, according to the method and the apparatus for preventing on-screen keys from being accidentally touched, the on-screen keys displayed on the touch screen can be covered by the protective mask when the user speaks on the phone to prevent the on-screen keys from being accidentally touched by the user. In addition, the present application also allows the user to remove the protective mask so as to operate the on-screen keys. Moreover, according to another embodiment of the present application, the user can quickly operate some commonly used keys not covered by the protective mask, such as a keypad key and a call ending key, during the phone call.

It will be apparent to those skilled in the art that various modifications and variations can be made to the structure of the present application without departing from the scope or spirit of the application. In view of the foregoing, it is intended that the present application cover modifications and variations of this application provided they fall within the scope of the following claims and their equivalents.

What is claimed is:

1. A method for preventing on-screen keys from being accidentally touched, adapted to a mobile device with a touch screen, the method comprising:
    displaying a user interface on the touch screen when the mobile device enters a communication mode, wherein the user interface comprises at least one on-screen key; and
    displaying a protective mask on the touch screen to cover the at least one on-screen key when the mobile device enters the communication mode, and disabling a function corresponding to the at least one on-screen key covered by the protective mask.

2. The method as claimed in claim 1, wherein the step of displaying the protective mask on the touch screen to cover the at least one on-screen key comprises:
    sliding the protective mask upwards from a lower edge of the touch screen to cover the at least one on-screen key.

3. The method as claimed in claim 1, wherein the step of displaying the protective mask on the touch screen to cover the at least one on-screen key comprises:
    displaying the protective mask on the touch screen in a translucent way to cover the at least one on-screen key.

4. The method as claimed in claim 1, wherein the step of displaying the user interface and the protective mask when the mobile device enters the communication mode comprises:
    displaying the user interface and the protective mask on the touch screen when the mobile device enters the communication mode from receiving a call-answering operation or dialling a phone call.

5. The method as claimed in claim 1, wherein after the step of displaying the protective mask on the touch screen to cover the at least one on-screen key, and disabling the function corresponding to the at least one on-screen key covered by the protective mask, the method further comprises:
    removing the protective mask and enabling the function corresponding to the at least one on-screen key.

6. The method as claimed in claim 5, wherein the step of removing the protective mask and enabling the function corresponding to the at least one on-screen key comprises:
    receiving a touch input;
    determining whether the touch input is started within a display range of the protective mask;
    determining whether the touch input is moved towards a specific direction if the touch input is started within the display range of the protective mask; and
    removing the protective mask and enabling the function corresponding to the at least one on-screen key if the touch input is moved towards the specific direction.

7. The method as claimed in claim 5, wherein the step of removing the protective mask comprises:
    sliding the protective mask downwards into the lower edge of the touch screen to remove the protective mask.

8. The method as claimed in claim 5, wherein after the step of removing the protective mask, and enabling the function corresponding to the at least one on-screen key, the method further comprises:
    accumulating an idle time of the user interface, and determining whether the idle time exceeds a predetermined time; and
    displaying the protective mask on the touch screen again to cover the at least one on-screen key, and disabling the function corresponding to the at least one on-screen key covered by the protective mask when the idle time exceeds the predetermined time.

9. The method as claimed in claim 1, wherein the step of displaying the protective mask on the touch screen to cover the at least one on-screen key, and disabling the function corresponding to the at least one on-screen key covered by the protective mask comprises:
    displaying the protective mask on the touch screen to cover at least one first type on-screen key in the user interface, and keeping at least one second type on-screen key in the user interface uncovered by the protective mask; and
    only disabling a function corresponding to the at least one first type on-screen key covered by the protective mask.

10. The method as claimed in claim 9, wherein the at least one second type on-screen key comprises a keypad-activating key and/or a call ending key.

11. The method as claimed in claim 9, wherein the at least one second type on-screen key is displayed in a specific region located at a lower part of the touch screen.

12. A non-transitory recording medium, for recording a computer program, wherein the computer program comprises a plurality of program codes, and the computer program is suitable for being loaded into a portable electronic device to enable the portable electronic device to execute the method for preventing on-screen keys from being accidentally touched according to claim 1.

13. An apparatus for preventing on-screen keys from being accidentally touched, adapted to a mobile device with a touch screen, comprising:
    a user interface module, displaying a user interface on the touch screen when the mobile device enters a communication mode, wherein the user interface comprises at least one on-screen key; and a protective mask display module, displaying a protective mask on the touch screen to cover the at least one on-screen key when the apparatus enters the communication mode, and disabling a function corresponding to the at least one on-screen key covered by the protective mask.

14. The apparatus as claimed in claim 13, wherein the protective mask display module slides the protective mask upwards from a lower edge of the touch screen to cover the at least one on-screen key.

15. The apparatus as claimed in claim 13, wherein the protective mask display module displays the protective mask on the touch screen in a translucent way to cover the at least one on-screen key.

16. The apparatus as claimed in claim 13, wherein when the mobile device enters the communication mode from receiving a call-answering operation or dialling a phone call, the user interface module and the protective mask display module respectively display the user interface and the protective mask on the touch screen.

17. The apparatus as claimed in claim 13, wherein the protective mask display module further removes the protective mask and enables the function corresponding to the at least one on-screen key.

18. The apparatus as claimed in claim 17, wherein the protective mask display module further determines whether a touch input received by the touch screen is started within a display range of the protective mask, and if the touch input is started within the display range of the protective mask, the protective mask display module further determines whether the touch input is moved towards a specific direction, and if the touch input is moved towards the specific direction, the protective mask display module removes the protective mask and enables the function corresponding to the at least one on-screen key.

19. The apparatus as claimed in claim 17, wherein the protective mask display module slides the protective mask downwards into the lower edge of the touch screen to remove the protective mask.

20. The apparatus as claimed in claim 17, wherein after the protective mask display module removes the protective mask and enables the function corresponding to the at least one on-screen key, the protective mask display module further accumulates an idle time of the user interface and determines whether the idle time exceeds a predetermined time, and when the idle time exceeds the predetermined time, the protective mask display module displays the protective mask on the touch screen again to cover the at least one on-screen key and disables the function corresponding to the at least one on-screen key covered by the protective mask.

21. The apparatus as claimed in claim 13, wherein the protective mask display module displays the protective mask on the touch screen to cover at least one first type on-screen key in the user interface, and keeps at least one second type on-screen key in the user interface uncovered by the protective mask, and only disables a function corresponding to the at least one first type on-screen key covered by the protective mask.

22. The apparatus as claimed in claim 21, wherein the at least one second type on-screen key comprises a keypad-activating key and/or a call ending key.

23. The apparatus as claimed in claim 21, wherein the at least one second type on-screen key is displayed in a specific region located at a lower part of the touch screen.

* * * * *